(12) United States Patent
Kornblatt et al.

(10) Patent No.: US 10,618,476 B2
(45) Date of Patent: Apr. 14, 2020

(54) EXHAUST FINISHER ATTACHMENT STRUCTURE

(71) Applicant: Nissan North America, Inc., Franklin, TN (US)

(72) Inventors: Andrew S Kornblatt, Farmington Hills, MI (US); Tyler Burns, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 110 days.

(21) Appl. No.: 15/907,471

(22) Filed: Feb. 28, 2018

(65) Prior Publication Data

US 2019/0263332 A1 Aug. 29, 2019

(51) Int. Cl.
| | | |
|---|---|---|
| *B60R 13/04* | (2006.01) | |
| *B60R 19/48* | (2006.01) | |
| *B62D 65/16* | (2006.01) | |
| *B60K 13/04* | (2006.01) | |

(52) U.S. Cl.
CPC ............. *B60R 13/04* (2013.01); *B60R 19/48* (2013.01); *B62D 65/16* (2013.01); *B60K 13/04* (2013.01)

(58) Field of Classification Search
CPC ......... B60R 13/04; B60R 19/48; B62D 65/16; B60K 13/04
USPC ....................................................... 296/1.08
See application file for complete search history.

(56) References Cited

U.S. PATENT DOCUMENTS

2013/0026749 A1\* 1/2013 O'Brien .............. B60R 13/0876
285/62

FOREIGN PATENT DOCUMENTS

JP          2007327457 A  * 12/2007

OTHER PUBLICATIONS

Chrysler 200C 3.6 Exh Fin and Exh Fin Brkt Design, 2014.
Mercedes E-Class 250 BlueTec 2.1 2014 Exh Fin and Exh Fin Brkt Design, 2014.
GD1D (QX30) Exh Fin and Exh Fin Brkt Design, 2014.
P71A (QX50) Exh Fin and Exh Fin Brkt Design, 2014.

\* cited by examiner

*Primary Examiner* — Joseph D. Pape
*Assistant Examiner* — Dana D Ivey
(74) *Attorney, Agent, or Firm* — Global IP Counselors, LLP (57) ABSTRACT

An exhaust finisher attachment structure includes a bracket attached to a rear bumper assembly, and an exhaust finisher attached to the bracket. The rear bumper assembly has a fascia that defines a forward-facing surface, a rearward facing finished surface and a recessed area along a lower portion of the fascia. The bracket is attached to the rear bumper assembly within the recessed area of the fascia. The bracket has at least one tab receiving structure with an opening open to a rearward facing side of the bracket. The exhaust finisher has at least one tab extending from an upper portion of the exhaust finisher. The tab extends in a vehicle forward direction from the upper portion. The tab is dimensioned and shaped to insert into the tab receiving structure of the bracket during installation from the rearward facing side of the bracket and the fascia.

17 Claims, 11 Drawing Sheets

EXHAUST FINISHER ATTACHMENT STRUCTURE

BACKGROUND

Field of the Invention

The present invention generally relates to an exhaust finisher attachment structure. More specifically, the present invention relates to an exhaust finisher attachment structure that includes a bracket that attaches to a rear bumper assembly and an exhaust finisher that attaches to the bracket such that during installation, the exhaust finisher is moved from a location rearward of the rear bumper assembly in a vehicle forward direction so that tabs of the exhaust finisher are inserted into tab receiving structures of the bracket thereby temporarily retaining the exhaust finisher in position prior to being rigidly fixed in position by mechanical fasteners.

Background Information

Many vehicles include exhaust finishers that serve at least two purposes. A first purpose is to improve the overall appearance of the rear end of the vehicle. Second, exhaust finishers are often designed as exhaust gas diffusers that mix exhaust gases from a tail pipe with fresh air.

SUMMARY

One object of the exhaust finisher of the present disclosure is to simplify installation of an exhaust finisher.

Another object is to provide an exhaust finisher attachment structure with a bracket that attaches to a rear bumper assembly and an exhaust finisher that attaches to the bracket such that during installation, the exhaust finisher is moved from a location rearward of the rear bumper assembly in a vehicle forward direction so that tabs of the exhaust finisher are inserted into tab receiving structures of the bracket thereby temporarily retaining the exhaust finisher in position prior to rigidly fixing the exhaust finisher in position by mechanical fasteners.

In view of the state of the known technology, one aspect of the present disclosure is to provide a vehicle with an exhaust finisher attachment structure that includes a bracket and an exhaust finisher. The vehicle includes a rear bumper assembly having a fascia that defines a forward-facing surface, a rearward facing finished surface and a recessed area along a lower portion of the fascia. The bracket attaches to the rear bumper assembly within the recessed area of the fascia. The bracket has at least one tab receiving structure with an opening open to a rearward facing side of the bracket. The exhaust finisher has at least one tab extending from an upper portion of the exhaust finisher. The tab extends in a vehicle forward direction from the upper portion. The tab is dimensioned and shaped to insert into the tab receiving structure of the bracket during installation from the rearward facing side of the bracket and the fascia.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
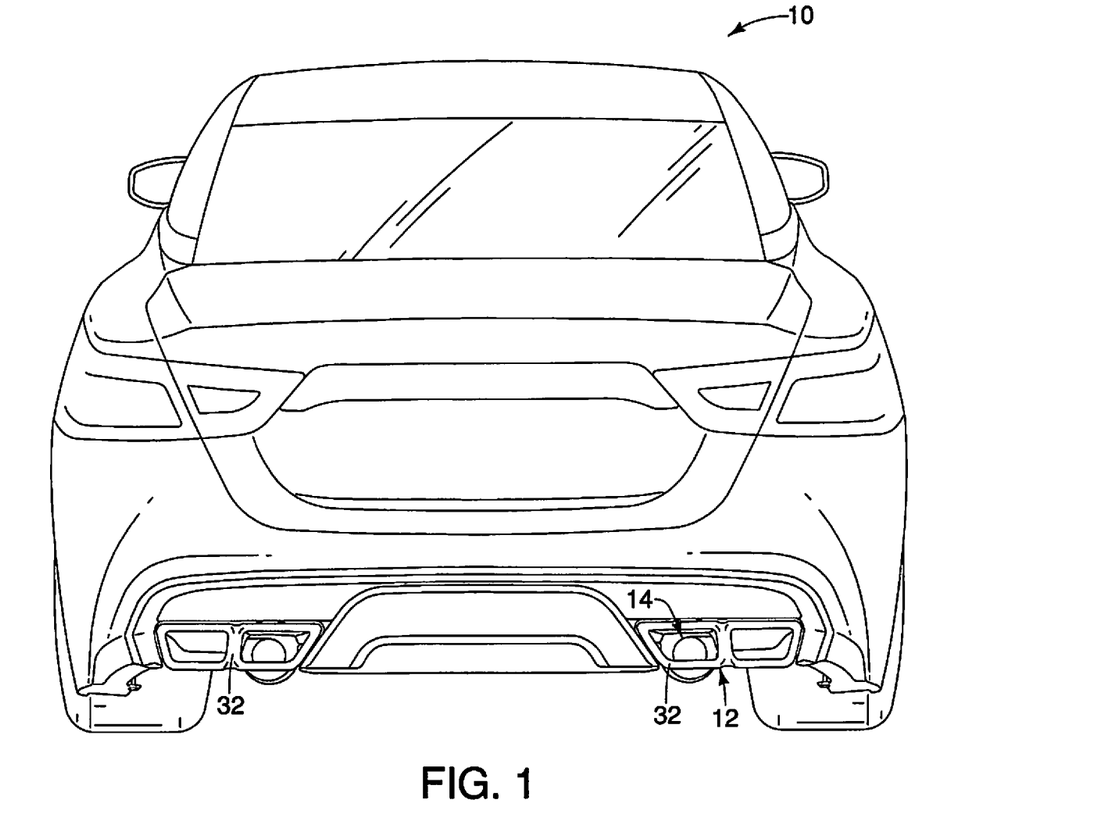
FIG. 1 is a rear view of a vehicle having a rear bumper assembly and an exhaust finisher attachment structure in accordance with a first embodiment.

Referring initially to FIG. 1, a vehicle 10 that includes an exhaust finisher attachment structure 12 is illustrated in accordance with a first embodiment. FIG. 1 shows a rear end of the vehicle 10.

The vehicle 10 also includes an exhaust system 14 and a rear bumper assembly 16. The exhaust system 14 includes a rear tail pipe 18 installed to the vehicle 10 in a conventional manner. Since exhaust systems are conventional vehicle components, only elements of the exhaust system 14 necessary for understanding the exhaust finisher attachment structure 12 are mentioned below. Otherwise, further description of exhaust systems is omitted for the sake of brevity.

The vehicle rear bumper assembly 16 includes a fascia 20 and also includes a support structure 22 that is shown only in FIGS. 12-14 and 18). The fascia 20 defines a rearward facing finished surface 24 (FIGS. 1-3 and 15-17), a forward-facing surface 25 (FIGS. 12-14 and 18) and a recessed area 26 along a lower portion of the fascia 20.

A description of the exhaust finisher attachment structure 12 is now provided with initial reference to FIGS. 3-11. The exhaust finisher attachment structure 12 basically includes a bracket 30 and an exhaust finisher 32.

In order to establish orientation of each of the bracket 30 and the exhaust finisher 32 relative to the vehicle 10, the following directions are defined relative to the vehicle 10 via the follow arrows shown in the drawings: a forward direction FD, a rearward direction $R_D$, an upward direction $U_D$ and a downward direction $D_D$.

The bracket 30, as shown in FIGS. 4-7, is formed as a single, unitary, monolithic element via, for example, an injection molding process, made of any of a variety of curable resin and/or polymer materials. Alternatively, the bracket 30 can be made of metallic materials, or any other suitable material capable of supporting the exhaust finisher 32.

The bracket 30 defines a rearward side 34, a forward side 36, an upper side 38 and a lower side 40. Each of the rearward side 34, the forward side 36, the upper side 38 and the lower side 40 are defined by a plurality of surfaces that face in a corresponding direction. The bracket 30 further includes a rearward extending flange 42 along the upper side 38, a first tab receiving structure 44, a second tab receiving structure 46, three finisher fastening structures 48a, 48b and 48c, and a pair of fascia fastening structure 50a and 50b.

The rearward extending flange 42 includes a pair of tabs 42a that are used when the bracket 30 is attached to the rear bumper assembly 16, as described in greater detail below. The tabs 42a extend below and parallel to the rearward extending flange 42.

Figure 5:
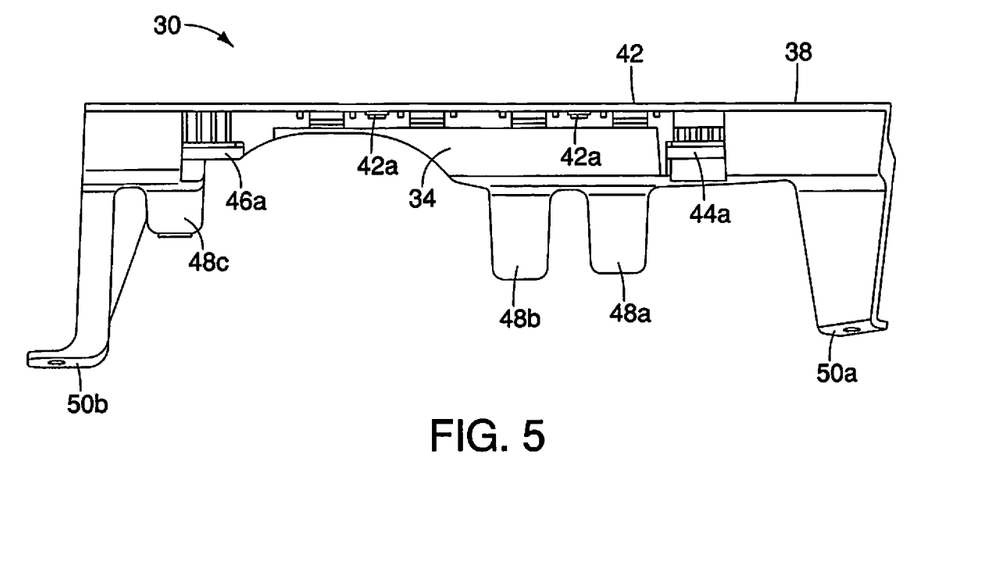
FIG. 5 is a rear view of the bracket removed from the vehicle showing a rearward side thereof, respective openings of the first and second tab receiving structures, the finisher fastening structures and the fascia structures in accordance with the first embodiment.
Figure 6:
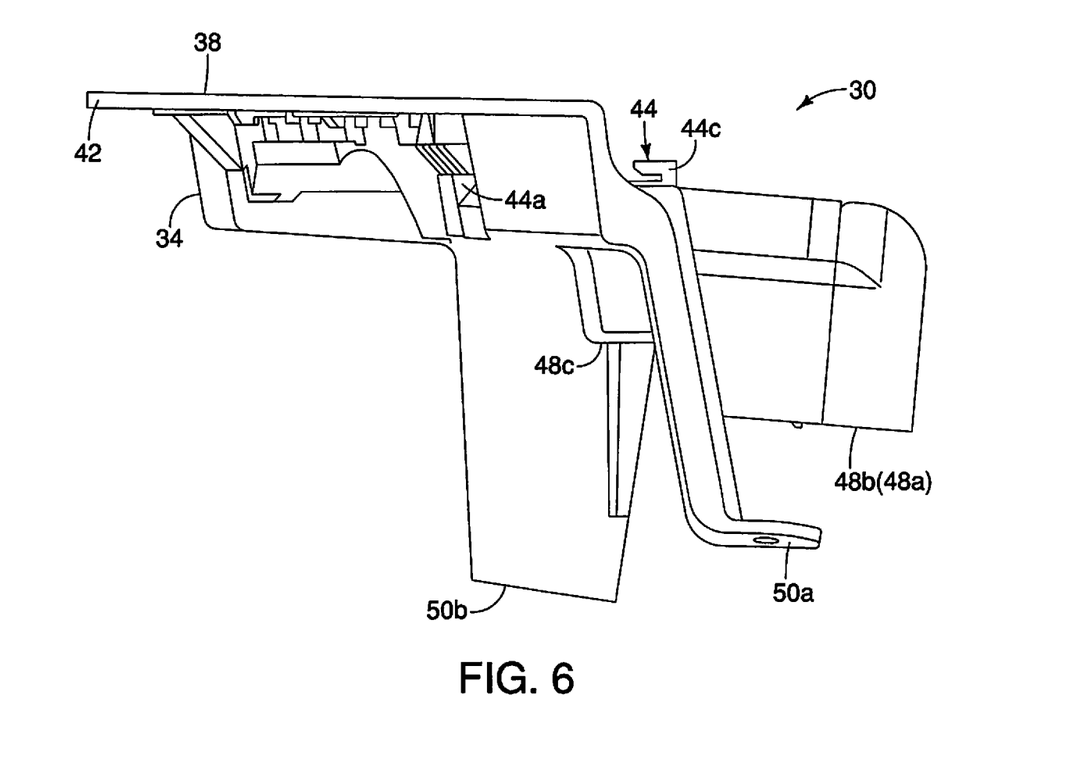
FIG. 6 is a side view of the bracket showing the opening of the first tab receiving structure, the finisher fastening structures and the fascia structures in accordance with the first embodiment.
Figure 7:
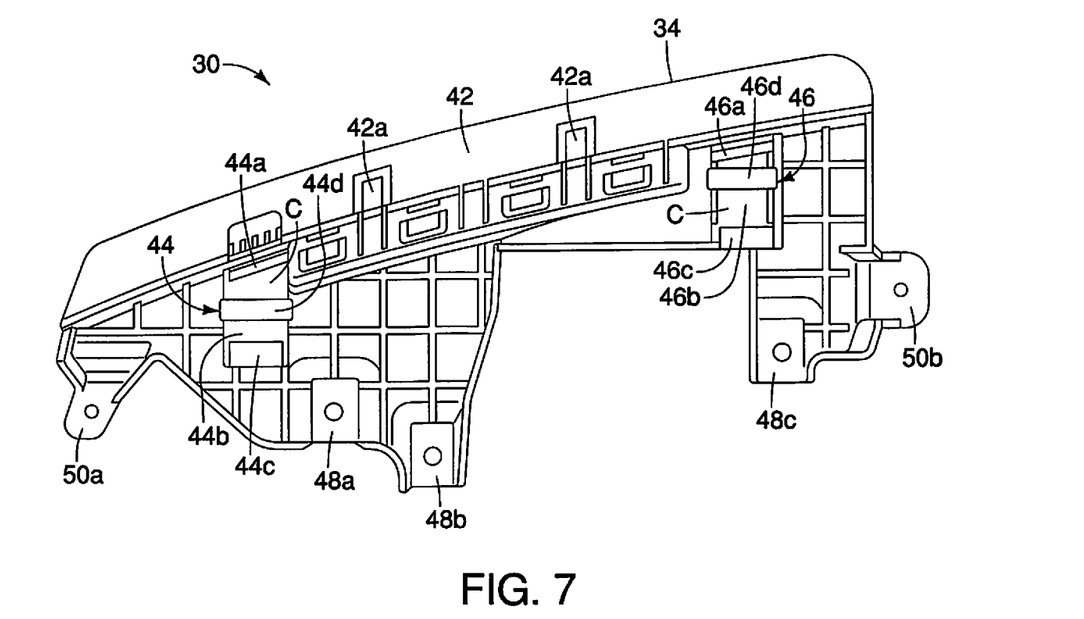
FIG. 7 is a top view of the bracket showing a upper side thereof, features of the first and second tab receiving structures, the finisher fastening structures and the fascia structures in accordance with the first embodiment.
Figure 8:
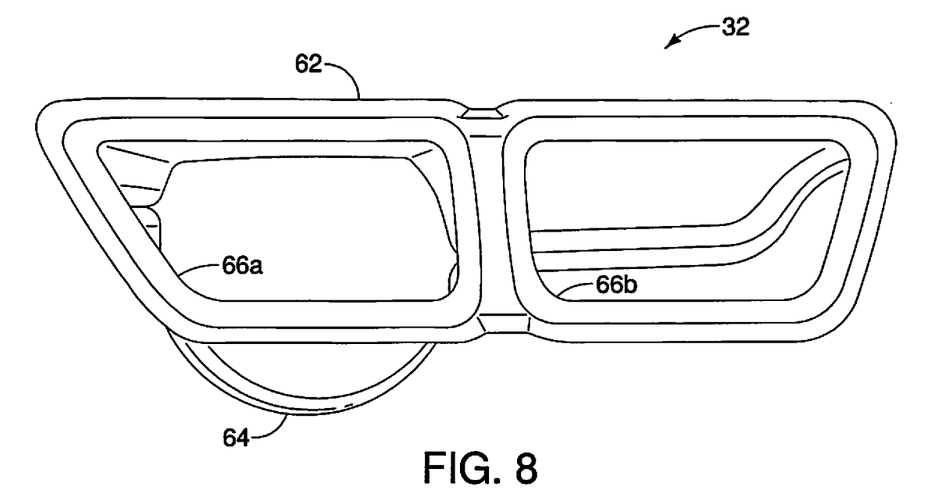
FIG. 8 is a rear view of the exhaust finisher removed from the vehicle showing a housing, exhaust outlet openings and an inlet opening in accordance with the first embodiment.
Figure 20:
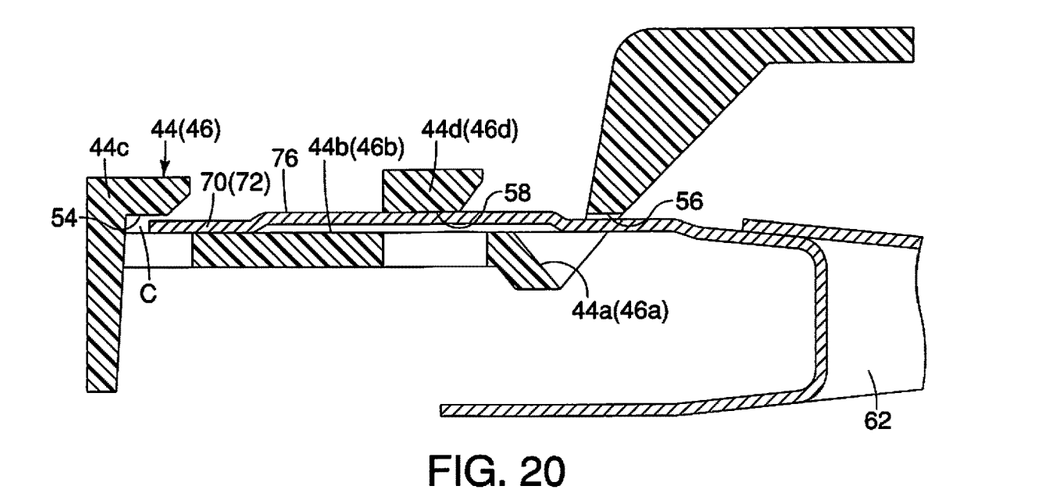
FIG. 20 is a cross-sectional side view of the first tab receiving structure of the bracket with the first tab of the exhaust finisher inserted therein in accordance with the first embodiment.

The first tab receiving structure 44 basically defines a channel C having an opening 44a. The opening 44a is open to the rearward side 34, as shown in FIG. 5. The channel C of the first tab receiving structure 44 includes a lower surface 44b, an end stop 44c and an upper, lateral stop 44d. As shown in FIG. 20, the end stop 44c has a hook shape in cross-section, the upper, lateral stop 44d defines an upper wall of the channel C and lateral side walls on either side of the channel C. The lower surface 44b is also referred to as a lower tab receiving surface 44b. As shown in FIG. 20, the end stop 44c defines a first upper tab receiving surface 54, with a second upper tab receiving surface 56 being defined within the opening 44a, and a third upper tab receiving surface 58 being defined along the upper, lateral stop 44d.

The second tab receiving structure 46 is basically with same as the first tab receiving structure 44 and has similar, if not identical dimensions. Specifically, the second tab receiving structure 46 basically defines another channel C having an opening 46a. The opening 46a is open to the rearward side 34, as shown in FIG. 5. The channel C of the second tab receiving structure 46 includes a lower surface 46b, an end stop 46c and an upper, lateral stop 46d. Although FIG. 20 is a cross-section of the first tab receiving structure 44, the features depicted apply equally to the second tab receiving structure 44. Specifically, the end stop 46c (like the end stop 44c) has a hook shape in cross-section, the upper, lateral stop 46d (like the upper, lateral stop 46d) defines an upper wall of the channel C and lateral side walls on either side of the channel C. Like the first tab receiving structure 46 and as shown in FIG. 20, the end stop 46c defines another first upper tab receiving surface 54, with another second upper tab receiving surface 56 being defined within the opening 46a, and another third upper tab receiving surface 58 being defined along the upper, lateral stop 46d.

A description of the exhaust finisher 32 is now provided with specific reference to FIGS. 8-11. The exhaust finisher 32 is basically a diffuser that receives exhaust gases from the rear tail pipe 18, draws in fresh air around the tail pipe 18 and under the vehicle 10, and mixes the two together. The exhaust finisher 32 is attached to the bumper assembly 16 via the bracket 30 in a manner described in greater detail below.

The exhaust finisher 32 is a hollow structure defined by a housing 62 that includes an inlet opening 64 (also referred to as an exhaust inlet opening) at a forward end thereof, two exhaust outlets 66a and 66b (also referred to as exhaust openings) at a rearward end thereof. The exhaust finisher 32 also includes fastening locations 68a, 68b and 68c, a first tab 70 and a second tab 72.

The fastening locations 68a, 68b and 68c are defined along lateral flanges that extend from opposite sides of the inlet opening 64. Specifically, the fastening locations 68a and 68b are located on the flange formed along a first side of the inlet opening 64 and the fastening location 68c is formed on a second side of the inlet opening 64, opposite the first side of the inlet opening 64.

Figure 9:
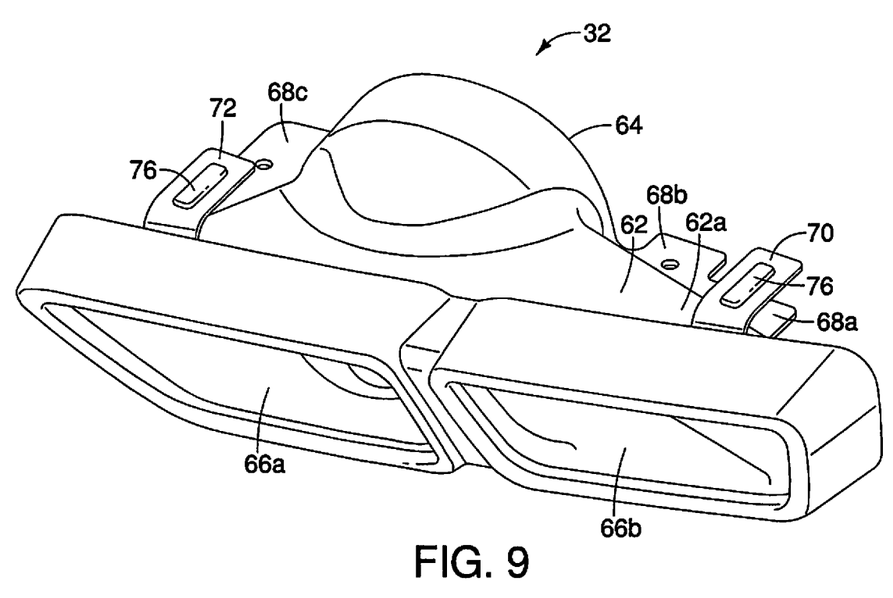
FIG. 9 is a perspective view of the exhaust finisher showing the housing, the exhaust outlet openings, the inlet opening, a first tab, a second tab and fastening locations in accordance with the first embodiment.
Figure 10:
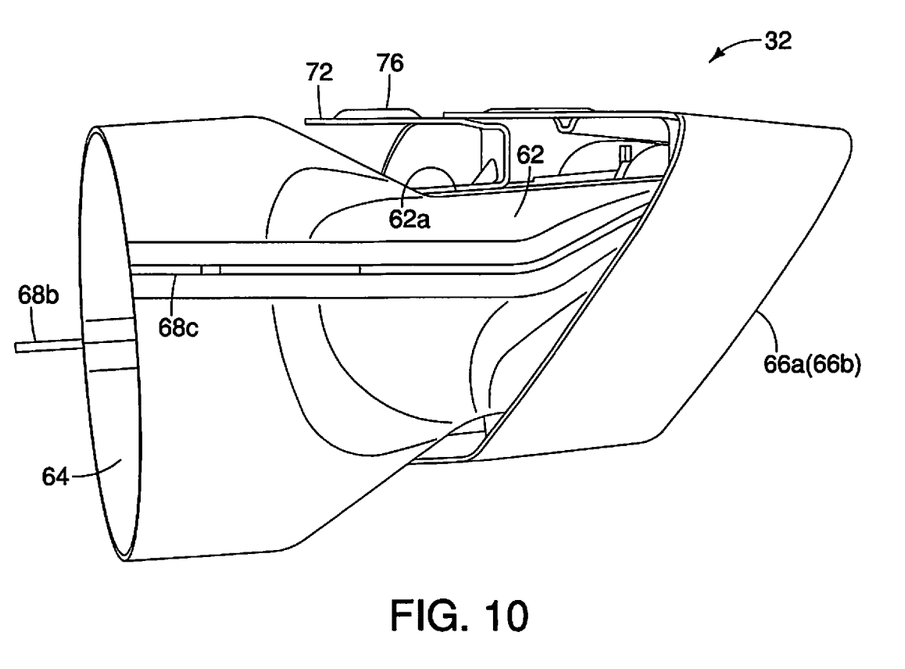
FIG. 10 is a side view of the exhaust finisher showing the housing, the inlet opening, the second tab and two of the fastening locations in accordance with the first embodiment.
Figure 11:
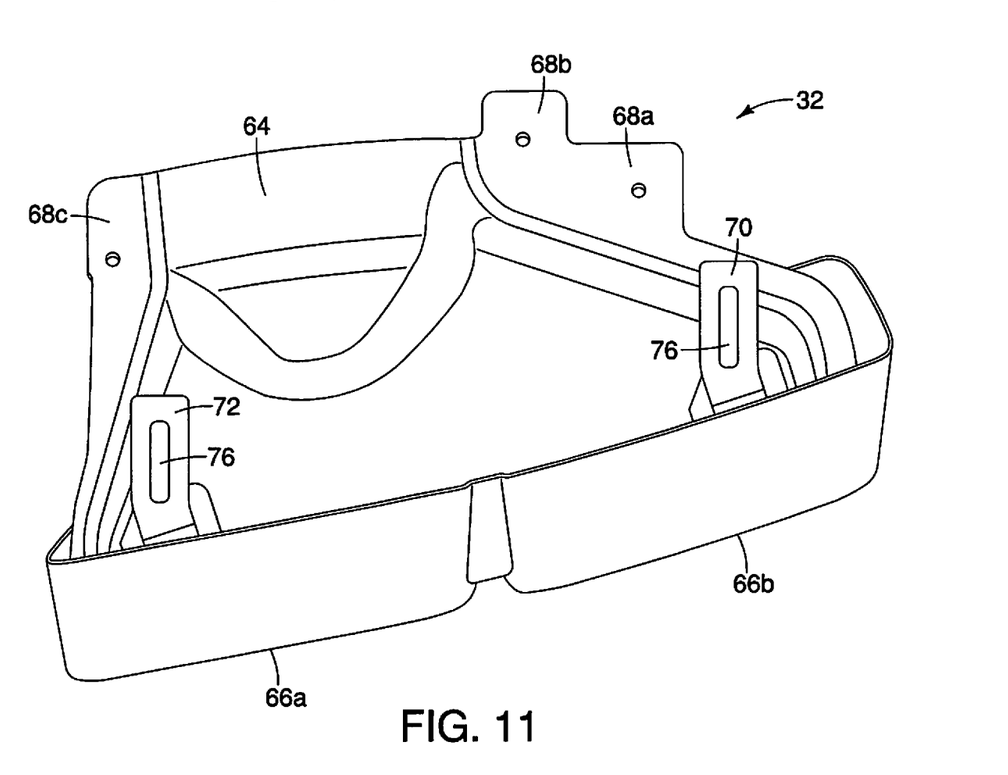
FIG. 11 is a top view of the exhaust finisher showing the housing, the inlet opening, the first tab, the second tab and the fastening locations in accordance with the first embodiment.

The housing 62 includes an upper portion 62a. The first tab 70 and the second tab 72 are rigidly fixed to upper portion 62a of the housing 62 via, for example, welding techniques or mechanical fasteners. The first tab 70 and the second tab 72 have elongated portions that extend in the vehicle forward direction FD.

The first tab 70 and the second tab 72 are parallel to one another, each being dimensioned and shaped to insert into corresponding ones of the first tab receiving structure 44 and the second tab receiving structure 46 of the bracket 30 during installation of the exhaust finisher 32. The orientation of the first tab receiving structure 44 and the second tab receiving structure 46, and the orientation of the first tab 70 and the second tab 72 are such that the exhaust finisher 32 is installed to the bracket 30 from the rearward facing side 34 of the bracket 30 and the rearward facing finished surface 24 of the fascia 20. In other words, when installing the exhaust finisher 32 to the bracket 30, the exhaust finisher is moved in a vehicle forward direction, and is installed from outside the rear structure of the vehicle (the rear bumper assembly 16), with the first and second tabs 70 and 72 inserted in to respective ones of the channels C.

Each of the first tab 70 and the second tab 72 includes a reinforcing rib 76 (an embossment) that extends along a central portion thereof each of the first and second tabs 70 and 72.

A description of the installation process of the bracket 30 to the rear bumper assembly 16, and the exhaust finisher 32 to the bracket 30, is now described with specific reference to FIGS. 2-3 and 12-21.

Figure 12:
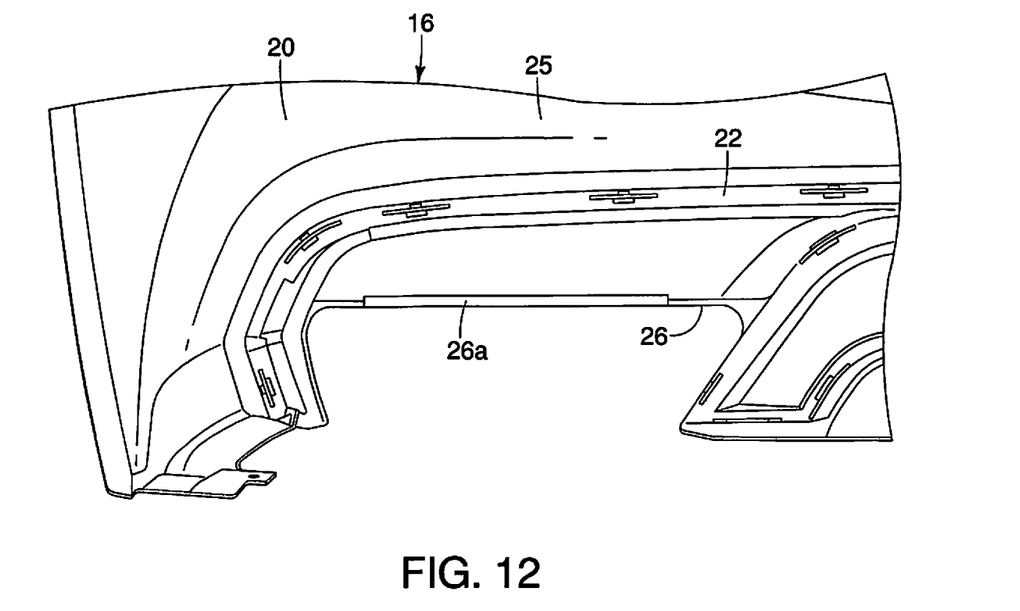
FIG. 12 is a perspective view of the rear bumper assembly showing a recessed area below a forward-facing surface of the bumper assembly, with the bracket and the exhaust finisher removed in accordance with the first embodiment.
Figure 15:
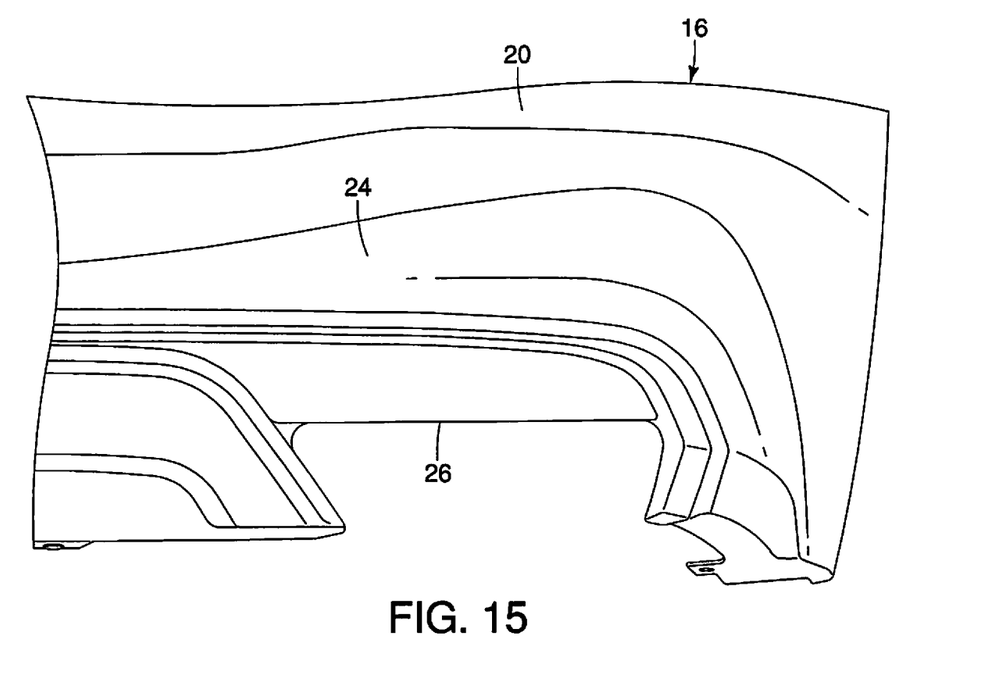
FIG. 15 is a perspective view of the rear of the vehicle showing the recessed area below a rearward facing surface of the bumper assembly, with the bracket and the exhaust finisher removed in accordance with the first embodiment.

In FIG. 12, the hidden side (the forward-facing surface 25 of the rear bumper assembly 16 is shown. The recessed area 26 includes an attachment lip 26a that extends horizontally along a top of the recessed area 26a. In the depicted embodiment, the attachment lip 26a is part of the fascia 20. However, it should be understood from the drawings and the description herein that the attachment lip 26a can alternatively be defined by a portion of the metallic support structure 22. As shown in FIG. 15, the attachment lip 26a is not visible.

Figure 13:
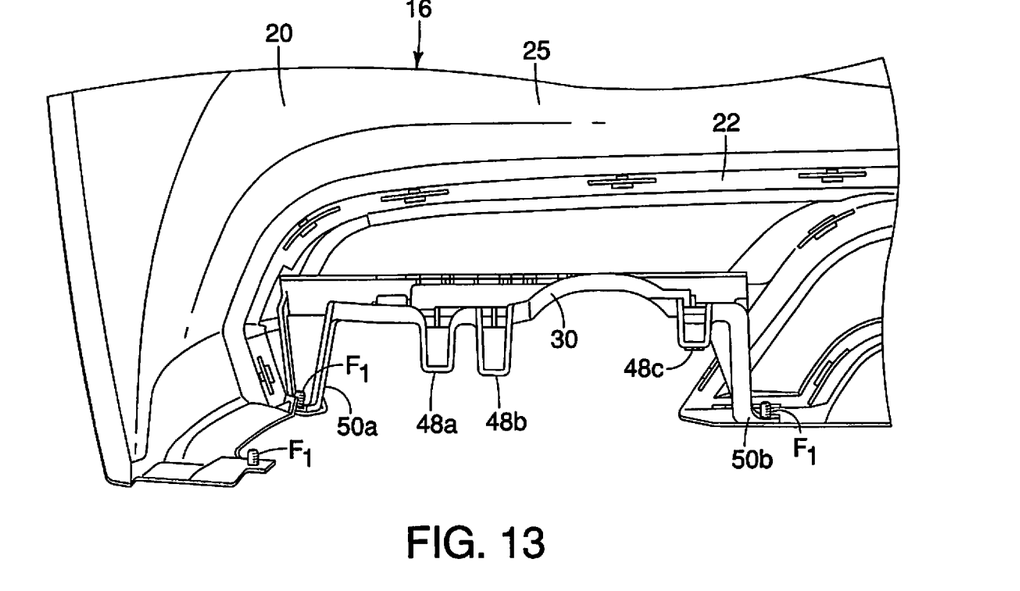
FIG. 13 is another perspective view of the rear bumper assembly similar to FIG. 12 showing the bracket installed along the recessed area below the forward-facing surface of the bumper assembly, with the exhaust finisher removed in accordance with the first embodiment.
Figure 16:
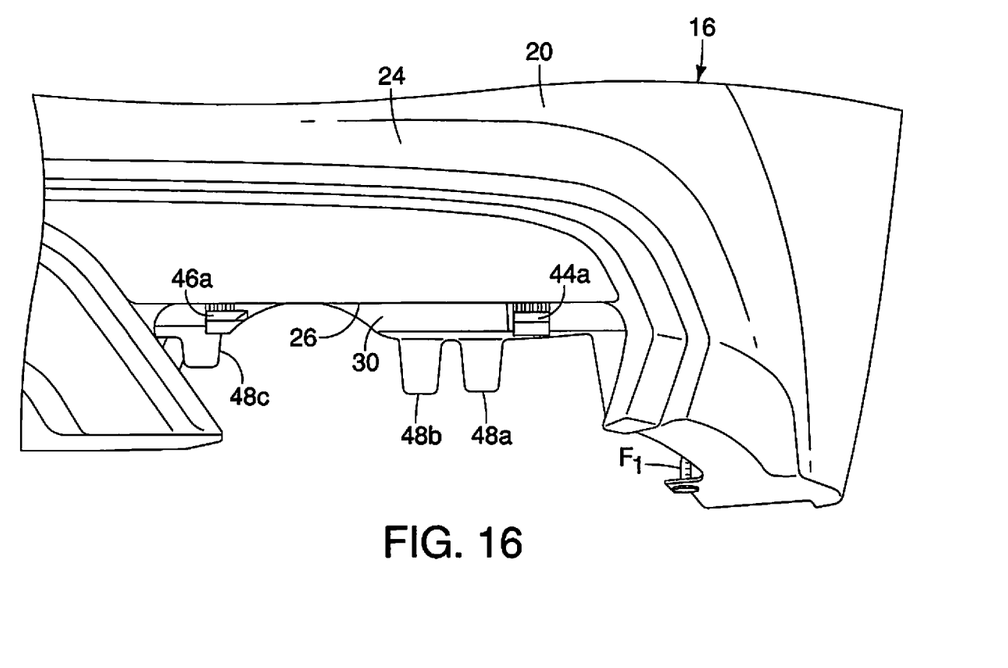
FIG. 16 is another perspective view of the rear of the vehicle similar to FIG. 15 showing the bracket installed to the rear bumper assembly in accordance with the first embodiment.
Figure 18:
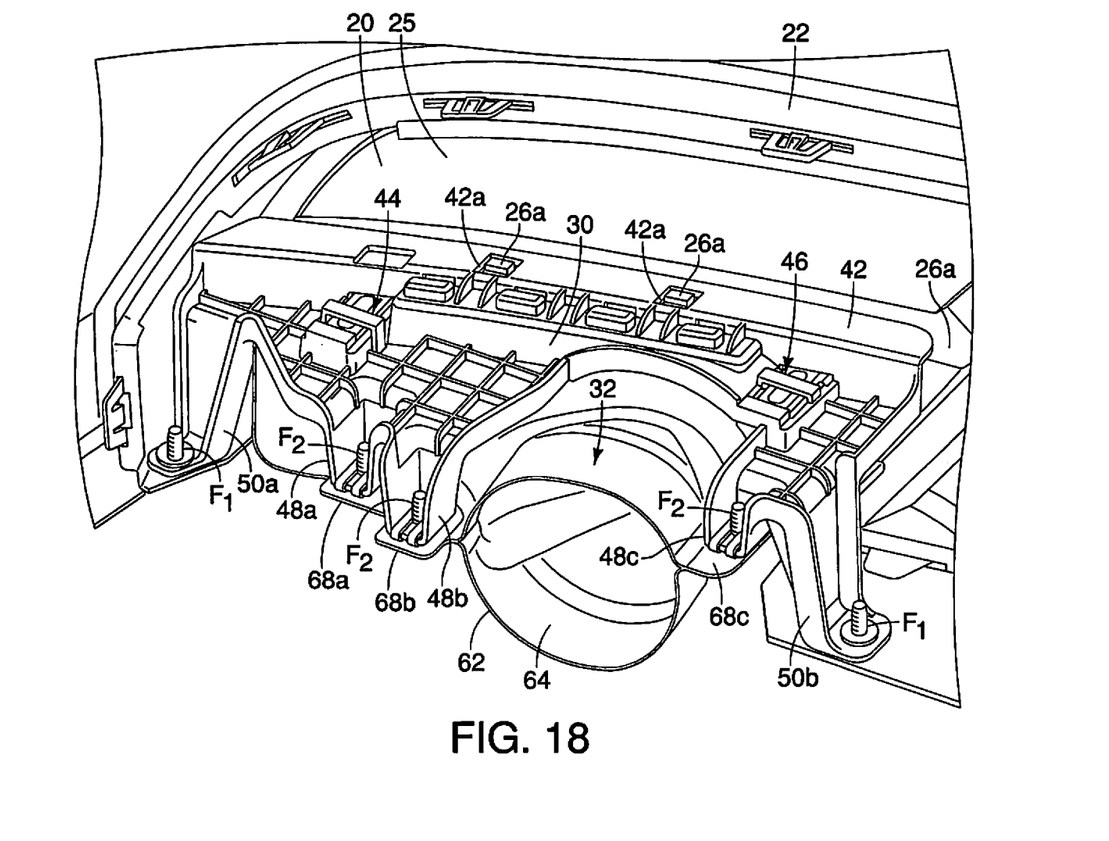
FIG. 18 is a perspective view showing the forward-facing side of the bumper assembly with the bracket installed to the bumper assembly and the exhaust installed to the bracket in accordance with the first embodiment.

As shown in FIGS. 13 and 16, the bracket 30 is initially installed by placing it above the recessed area 26 and moving it into contact with the forward-facing surface 25 of the fascia 20. As the bracket 30 is moved rearward against the attachment lip 26a, the tabs 42a lock onto the attachment lip 26a such that the tabs 42a are pushed below the attachment lip 26a and the rearward extending flange 42 of the bracket 30 is pushed above the attachment lip 26a, as shown in FIG. 18. The engagement between the flange 42, the attachment lip 26a and the tabs 42a temporarily secure the bracket 30 in position relative to the fascia 20. Next, as shown in FIG. 13, fasteners $F_1$ connect the rear bumper assembly 16 and the bracket 30 to one another at the fascia fastening structure 50a and 50b.

Figure 3:
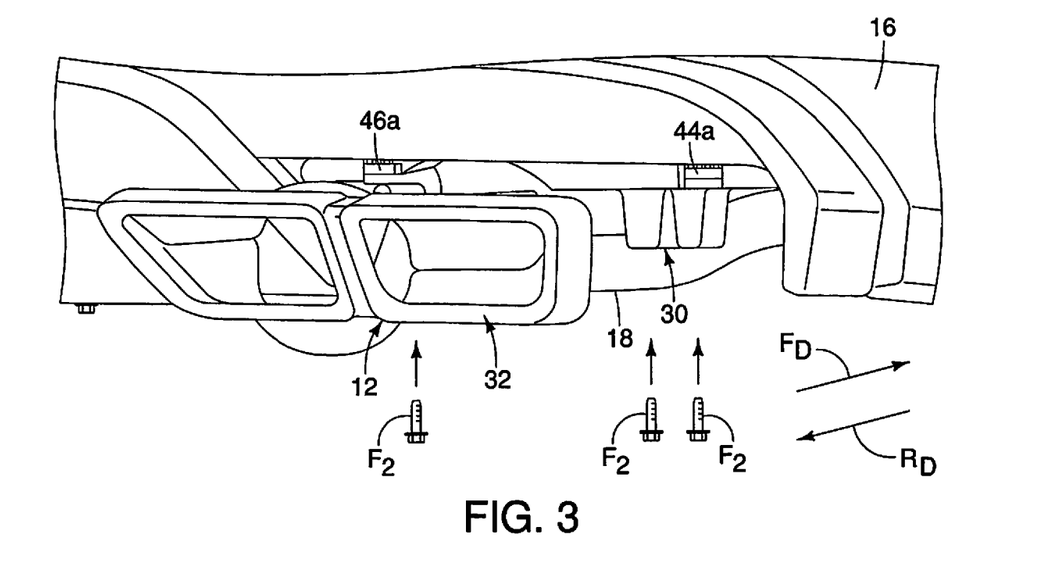
FIG. 3 is a rear exploded perspective view of the portion of the vehicle depicted in FIG. 2, showing a bracket and an exhaust finisher of the exhaust finisher attachment structure with the bracket installed to the rear bumper assembly and the exhaust finisher in an orientation ready for installation and attachment to the bracket in accordance with the first embodiment.
Figure 4:
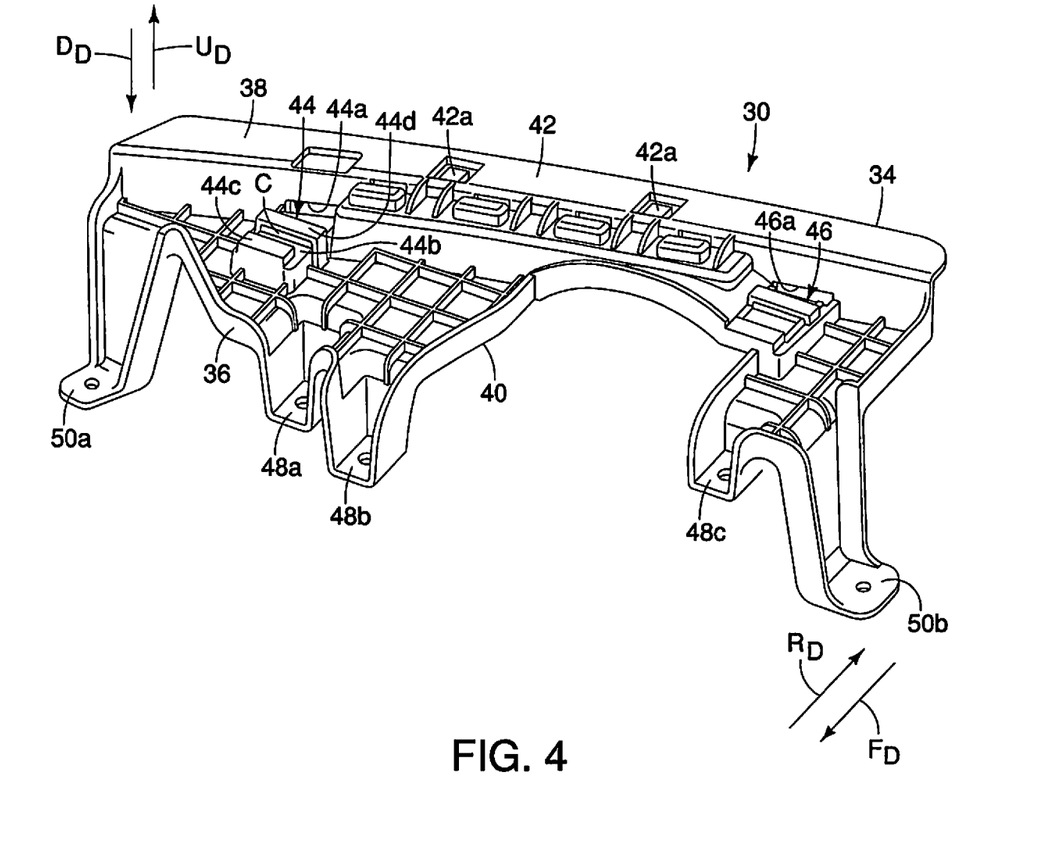
FIG. 4 is a perspective view of the bracket shown removed from the vehicle and the rear bumper assembly showing a forward side of the bracket, a first tab receiving structure, a second tab receiving structure, three finisher fastening structures and two fascia structures in accordance with the first embodiment.
Figure 14:
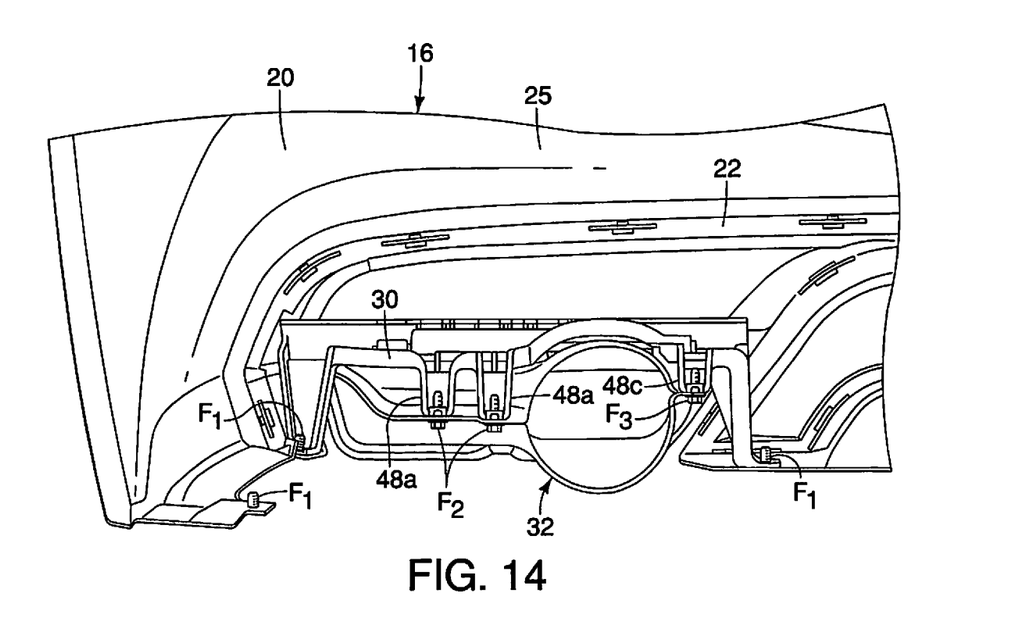
FIG. 14 is another perspective view of the rear bumper assembly similar to FIGS. 12 and 13 showing the exhaust finisher installed to the bracket in accordance with the first embodiment.
Figure 17:
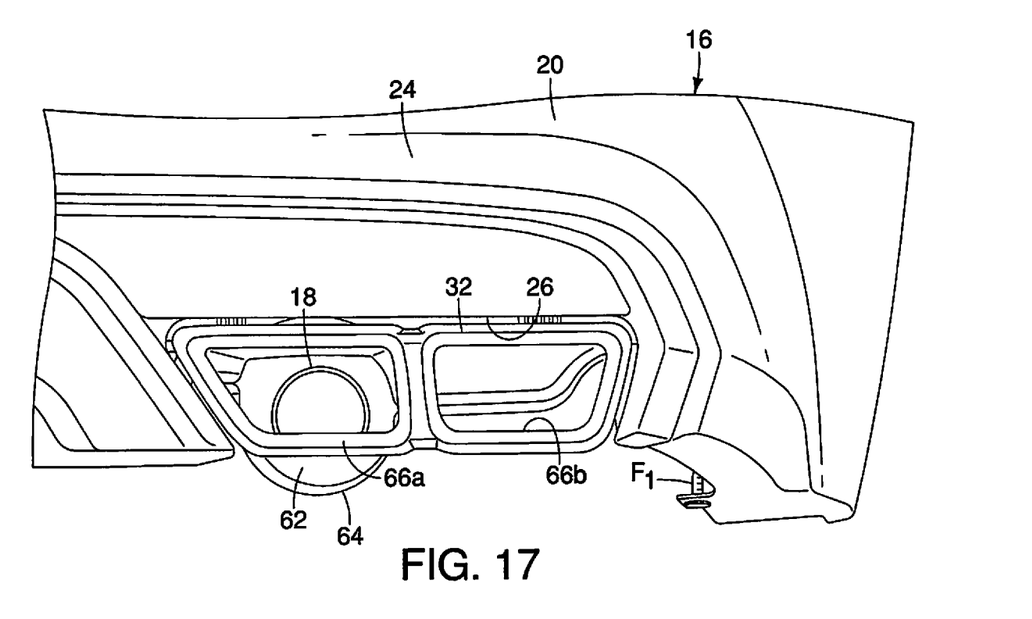
FIG. 17 is another perspective view of the rear of the vehicle similar to FIGS. 15 and 16 showing the exhaust finisher installed to the bracket in accordance with the first embodiment.

Next, as shown in FIGS. 3, 14 and 17, the exhaust finisher 32 is inserted from a rear side of the vehicle 10 (and a rear side of the rear bumper assembly 16) into the recessed area 26 of the rear bumper assembly 16. During movement from a rearward position to a forward position relative to the vehicle 10, the first tab 70 is inserted into the opening 44a of the first tab receiving structure 44 of the bracket 30, and the second tab 72 is inserted into the opening 46a of the first tab receiving structure 46 of the bracket 30. The first and second tabs 70 and 72 are then pushed fully into the channels C respective ones of the first tab receiving structure 44 and the second tab receiving structure 46.

Figure 21:
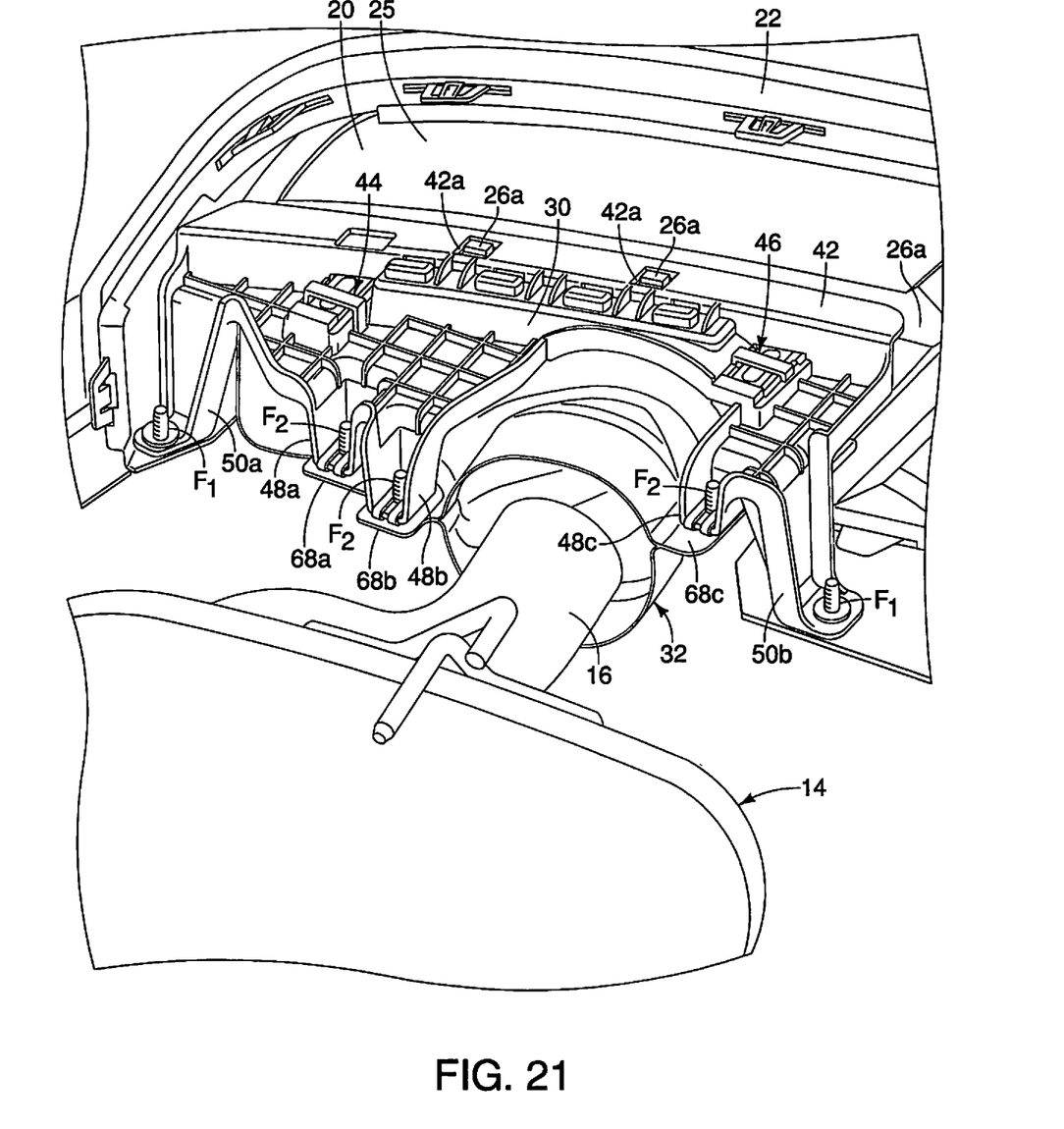
FIG. 21 is a perspective view of a forward-facing side of the bumper assembly showing the bracket attached to the bumper assembly, the exhaust finisher installed to the bracket and the tail pipe of the exhaust system extending into the inlet opening of the exhaust finisher in accordance with the first embodiment.

During installation of the exhaust finisher 32 to the bracket 30, and the vehicle 10, the exhaust inlet opening 64 is aligned with the rear tail pipe 18 such that the rear tail pipe 18 extends into the exhaust inlet opening 64 of the exhaust finisher 32 Preferably, the rear tail pipe 18 is centered within the exhaust inlet opening 64 of the exhaust finisher 32 such that the rear tail pipe 18 is concentrically positioned within the exhaust inlet opening 64. However, the relationship between the rear tail pipe 18 and the exhaust inlet opening 64 need not be concentric, as long as there is no contact between the rear tail pipe 18 and the exhaust inlet opening 64.

Figure 19:
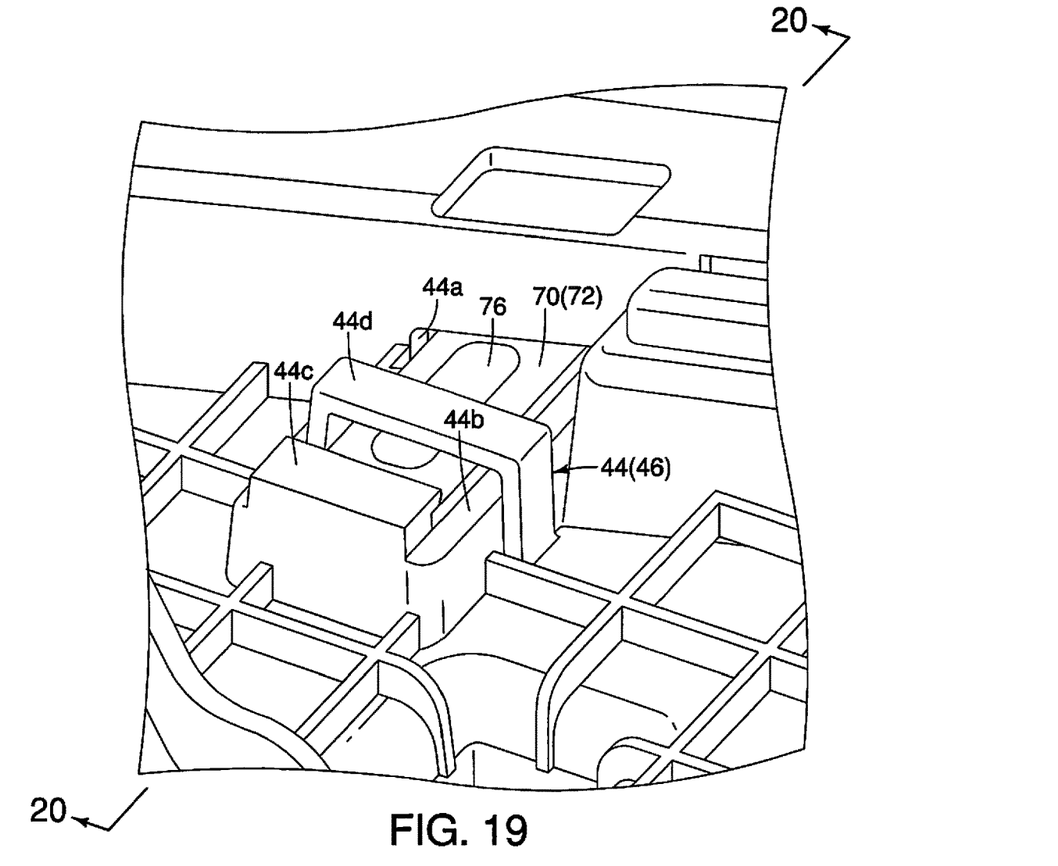
FIG. 19 is a perspective view of an upper side of the bracket with the exhaust finisher installed to the bracket showing the first tab of the exhaust finisher installed into the first tab receiving structure of the bracket in accordance with the first embodiment

As shown in FIGS. 19 and 20, once the first and second tabs 70 and 72 are fully installed within respective ones of the first and second tab receiving structures 44 and 46, the first and second tabs 70 and 72 holds the exhaust finisher 32 in place until the fasteners $F_2$ are installed.

Specifically, a lower surface the first tab 70 overlays the surface 44b of the first tab receiving structure 44. A distal end of the first tab 70 is retained and restrained against upward movement from above by the first upper tab receiving surface 54 of the end stop 44c of the first tab receiving structure 44. A rearward portion of the first tab 70 is restricted against upward movement by the second upper tab receiving surface 56 that partially defines the opening 44a. Finally, the rib or raised embossment 76 of the first tab 70 contacts the third upper tab receiving surface 58 of the upper, lateral stop 44d. Thus, the first tab 70 is retained in place, once fully installed into the first tab receiving structure 44.

Similarly, a lower surface the second tab 72 overlays the surface 46b of the second tab receiving structure 46. A distal end of the second tab 72 is retained and restrained against upward movement from above by the first upper tab receiving surface 54 of the end stop 46c of the second tab receiving structure 46. A rearward portion of the second tab 72 is restricted against upward movement by the second upper tab receiving surface 56 that partially defines the opening 46a. Finally, the rib or raised embossment 76 of the second tab 72 contacts the third upper tab receiving surface 58 of the upper, lateral stop 46d. Thus, the second tab 72 is retained in place, once fully installed into the second tab receiving structure 46.

Figure 2:
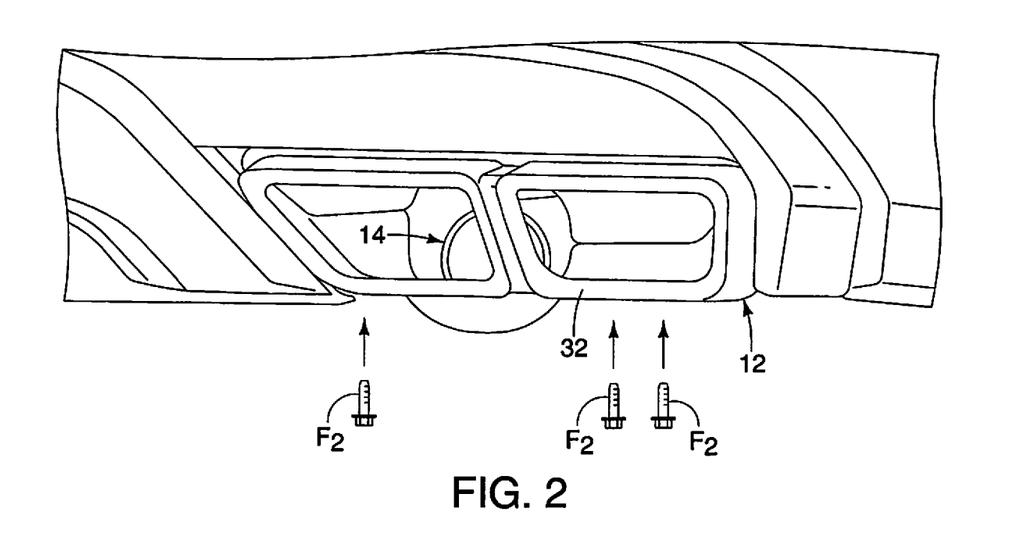
FIG. 2 is a rear view of a portion of the vehicle showing a portion of the rear bumper assembly, the exhaust finisher attachment structure and a tail pipe of an exhaust system in accordance with the first embodiment.

Thereafter, as shown in FIGS. 2, 3 and 18, the fasteners $F_2$ are installed securing the fastening locations 68a, 68b and 68c to the three finisher fastening structures 48a, 48b and 48c.

Thus, the exhaust finisher 32 is installed from the rear of the vehicle 10. One advantage to this arrangement is that the exhaust system 14 can be installed to the vehicle 10 prior to installing the exhaust finisher 32. Further, the exhaust finisher 32 can be installed to the bracket 30 and the rear bumper assembly 16 regardless of whether or not the exhaust system 14 is installed to the vehicle 10. Further, the exhaust finisher 32 can be installed in a simplified manner, as compared to the prior art, in that the exhaust finisher 32 is held in position to the bracket 30 and the rear bumper assembly 16 by the interaction between the first and second tabs 70 and 72 and the first and second tab receiving structures 44 and 46. There is no need for a technician to hold the exhaust finisher 32 in position when securing the exhaust finisher 32 to the bracket 30 using the fasteners $F_2$.

The various vehicle components of the vehicle 10 (other than the bracket 30 and the exhaust finisher 32) are conventional components that are well known in the art. Since these vehicle components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the exhaust finisher attachment structure. Accordingly, these terms, as utilized to describe the present invention should be interpreted relative to a vehicle equipped with the exhaust finisher attachment structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. An exhaust finisher attachment structure, comprising:
    a vehicle rear bumper assembly having a fascia that defines a forward-facing surface, a rearward facing finished surface and a recessed area along a lower portion of the fascia;
    a bracket attached to the vehicle rear bumper assembly within the recessed area of the fascia, the bracket having at least one tab receiving structure with an opening open to a rearward facing side of the bracket; and
    an exhaust finisher having at least one tab extending from an upper portion of the exhaust finisher, the tab extending in a vehicle forward direction from the upper portion, the tab being dimensioned and shaped to insert into the tab receiving structure of the bracket during installation from the rearward facing side of the bracket and the fascia,
    the at least one tab including a reinforcing rib that extends along a central portion of the at least one tab,
    the at least one tab receiving structure further including a lower tab receiving surface, a first upper tab receiving surface and a second upper tab receiving surface, such that with the at least one tab inserted into the at least one tab receiving structure a lower surface of the tab overlays the lower tab surface, an upper surface of the at least one tab at a distal end thereof contacts the first upper tab receiving surface and a rearward portion of the upper surface of the at least one tab contacts the second upper tab receiving surface.

2. The exhaust finisher attachment structure according to claim 1, wherein
    the at least one tab receiving structure of the bracket includes a first tab receiving structure and a second tab receiving structure, and
    the at least one tab of the exhaust finisher includes a first tab and a second tab dimensioned and shaped to insert into respective ones of the first tab receiving structure and the second tab receiving structure.

3. The exhaust finisher attachment structure according to claim 2, wherein
    the first tab and the second tab of the exhaust finisher extend in directions parallel to one another.

4. The exhaust finisher attachment structure according to claim 1, wherein
    the at least one tab receiving structure further includes a third upper tab receiving surface located between the first and second upper tab receiving surfaces such that the reinforcing rib contacts the third upper tab receiving surface with the at least one tab inserted into the at least one tab receiving structure.

5. The exhaust finisher attachment structure according to claim 1, wherein
    the exhaust finisher includes at least one exhaust opening facing rearward with the bracket and the exhaust finisher installed to the vehicle rear bumper assembly.

6. The exhaust finisher attachment structure according to claim 5, wherein
    the exhaust finisher includes an exhaust inlet opening facing forward with the bracket and the exhaust finisher installed to the vehicle rear bumper assembly.

7. The exhaust finisher attachment structure according to claim 6, further comprising
    an exhaust system having a rear tail pipe installed to the vehicle, such that during installation of the exhaust finisher to the bracket and the vehicle, the exhaust inlet opening is aligned with the rear tail pipe such that the rear tail pipe extends into the exhaust inlet opening of the exhaust finisher.

8. An exhaust finisher attachment structure comprising:
a vehicle rear bumper assembly having a fascia that defines a forward-facing surface, a rearward facing finished surface and a recessed area along a lower portion of the fascia;
a bracket attached to the vehicle rear bumper assembly within the recessed area of the fascia, the bracket having at least one tab receiving structure with an opening open to a rearward facing side of the bracket; and
an exhaust finisher having at least one tab extending from an upper portion of the exhaust finisher, the tab extending in a vehicle forward direction from the upper portion, the tab being dimensioned and shaped to insert into the tab receiving structure of the bracket during installation from the rearward facing side of the bracket and the fascia,
the at least one tab receiving structure includes a lower tab receiving surface, a first upper tab receiving surface and a second upper tab receiving surface, such that with the at least one tab inserted into the at least one tab receiving structure a lower surface of the tab overlays the lower tab surface, an upper surface of the at least one tab at a distal end thereof contacts the first upper tab receiving surface and a rearward portion of the upper surface of the at least one tab contacts the second upper tab receiving surface.

9. The exhaust finisher attachment structure according to claim 8, wherein
the at least one tab receiving structure of the bracket includes a first tab receiving structure and a second tab receiving structure, and
the at least one tab the exhaust finisher includes a first tab and a second tab dimensioned and shaped to insert into respective ones of the first tab receiving structure and the second tab receiving structure.

10. The exhaust finisher attachment structure according to claim 9, wherein
the first tab and the second tab of the exhaust finisher extend in directions parallel to one another.

11. The exhaust finisher attachment structure according to claim 10, wherein
the at least one tab includes a reinforcing rib that extends along a central portion of the at least one tab.

12. A method of installing as exhaust finisher to a vehicle, the method comprising:
installing a rear bumper assembly to a vehicle, the rear bumper assembly having a fascia that defines a forward-facing surface, a rearward facing finished surface and a recessed area along a lower portion of the fascia;
providing a bracket with at least one tab receiving structure with an opening open to a rearward facing side of the bracket;
installing the bracket to the vehicle rear bumper assembly within the recessed area of the fascia;
providing an upper portion of an exhaust finisher with at least one tab extending in a vehicle forward direction; and
installing the exhaust finisher to the bracket such that the at least one tab is inserted into the tab receiving structure of the bracket during installation from the rearward facing side of the bracket and the fascia,
the providing of the bracket with the at least one tab receiving structure includes the at least one tab receiving structure having a lower tab receiving surface, a first upper tab receiving surface and a second upper tab receiving surface, such that with the at least one tab inserted into the at least one tab receiving structure a lower surface of the tab overlays the lower tab surface, an upper surface of the at least one tab at a distal end thereof contacts the first upper tab receiving surface and a rearward portion of the upper surface of the at least one tab contacts the second upper tab receiving surface.

13. The method of installing as exhaust finisher to a vehicle according to claim 12, the method further comprising
installing an exhaust system to the vehicle prior to installing the exhaust finisher, the exhaust system having a rear tail pipe that extends toward the recessed area of the fascia; and
during the installing of the exhaust finisher to the bracket, an exhaust inlet opening at a forward side of the exhaust finisher is aligned with the rear tail pipe such that the rear tail pipe extends into the exhaust inlet opening of the exhaust finisher.

14. The method of installing as exhaust finisher to a vehicle according to claim 12, wherein
the providing of the bracket with the at least one tab receiving structure includes the at least one tab receiving structure of the bracket having a first tab receiving structure and a second tab receiving structure.

15. The method of installing as exhaust finisher to a vehicle according to claim 14, wherein
the providing of the upper portion of the exhaust finisher with the at least one tab includes the at least one tab the exhaust finisher having a first tab and a second tab dimensioned and shaped to insert into respective ones of the first tab receiving structure and the second tab receiving structure.

16. The method of installing as exhaust finisher to a vehicle according to claim 15, wherein
the providing of the upper portion of the exhaust finisher with the first tab and the second tab includes the first tab and the second tab of the exhaust finisher extending in directions parallel to one another.

17. The method of installing as exhaust finisher to a vehicle according to claim 15, wherein
the providing of the upper portion of the exhaust finisher with the first tab and the second tab includes each of the first tab and the second tab having a reinforcing rib that extends along a central portion of each of the first tab and the second tab.

\* \* \* \* \*